(12) United States Patent
Mei et al.

(10) Patent No.: US 10,995,663 B2
(45) Date of Patent: May 4, 2021

(54) REGENERATIVE COMPRESSED AIR ENERGY STORAGE SYSTEM AND USING METHOD THEREOF

(71) Applicant: Tsinghua University, Beijing (CN)

(72) Inventors: Shengwei Mei, Beijing (CN); Xiaodai Xue, Beijing (CN); Xuelin Zhang, Beijing (CN); Tong Zhang, Beijing (CN); Laijun Chen, Beijing (CN); Qiang Lu, Beijing (CN); Tianwen Zheng, Beijing (CN)

(73) Assignee: Tsinghua University, Beijing (CN)

( * ) Notice: Subject to any disclaimer, the term of this patent is extended or adjusted under 35 U.S.C. 154(b) by 0 days.

(21) Appl. No.: 16/522,604

(22) Filed: Jul. 25, 2019

(65) Prior Publication Data
US 2020/0032707 A1    Jan. 30, 2020

(30) Foreign Application Priority Data
Jul. 25, 2018    (CN) .......................... 201810827661.X

(51) Int. Cl.
    *F02C 6/16*    (2006.01)
(52) U.S. Cl.
    CPC ..................... *F02C 6/16* (2013.01)
(58) Field of Classification Search
    CPC ......... F02C 1/04; F02C 6/16; F05D 2260/213
    See application file for complete search history.

(56) References Cited

U.S. PATENT DOCUMENTS

| | | | |
|---|---|---|---|
| 6,089,024 A * | 7/2000 | Hatanaka | F01K 21/047 60/39.182 |
| 6,223,523 B1 * | 5/2001 | Frutschi | F01K 21/042 60/39.182 |

(Continued)

FOREIGN PATENT DOCUMENTS

| | | |
|---|---|---|
| CN | 107762579 A | 3/2018 |
| JP | 2017008887 A | 1/2017 |

(Continued)

OTHER PUBLICATIONS

The First Chinese Office Action for Application No. 201810827661.X dated Apr. 10, 2019, 8 pages, [English Translation].

(Continued)

*Primary Examiner* — Shafiq Mian
(74) *Attorney, Agent, or Firm* — Womble Bond Dickinson (US) LLP

(57) ABSTRACT

A regenerative compressed air energy storage system and a using method thereof. The system comprises a compressor unit, a high-temperature heat exchanger, a medium-temperature heat exchanger, an air storage chamber, a regulating valve, a medium-temperature regenerator, a high-temperature regenerator and an expander unit which are connected in sequence. The low-temperature side of the high-temperature heat exchanger, a high-temperature heat reservoir, a first valve, the high-temperature side of the high-temperature regenerator, a high-temperature cold reservoir and a second valve are connected in sequence. The low-temperature side of the medium-temperature heat exchanger, a medium-temperature heat reservoir, a third valve, the high-temperature side of the medium-temperature regenerator, a medium-temperature cold reservoir and a fourth valve are connected in sequence. A heating pipe inlet inside a compressor unit lubrication station communicates with the high-temperature (Continued)

cold reservoir through a high-temperature valve, and a heating pipe outlet communicates with of an intermediate cold reservoir.

9 Claims, 8 Drawing Sheets

(56) References Cited

U.S. PATENT DOCUMENTS

| | | | |
|---|---|---|---|
| 8,640,491 B2* | 2/2014 | Shoulders | F25B 31/004 |
| | | | 208/184 |
| 8,726,627 B2* | 5/2014 | Sasaki | F02C 3/305 |
| | | | 60/39.5 |
| 10,487,695 B2* | 11/2019 | Watkins | F02C 3/04 |
| 2018/0080346 A1* | 3/2018 | Mei | F01K 13/006 |
| 2019/0301749 A1* | 10/2019 | Houssainy | F01K 7/16 |
| 2020/0032802 A1* | 1/2020 | Mei | F02C 6/16 |

FOREIGN PATENT DOCUMENTS

| | | |
|---|---|---|
| JP | 2017141696 A | 8/2017 |
| JP | 2017141992 A | 8/2017 |
| JP | 2017160863 A | 9/2017 |

OTHER PUBLICATIONS

The First Chinese Search Report for Application No. 201810827661X dated Apr. 2, 2019, 3 pages, [English Translation].
The Supplementary Search Report for Application No. 201810827661X dated Jun. 17, 2019, 1 page, [English Translation].

* cited by examiner

REGENERATIVE COMPRESSED AIR ENERGY STORAGE SYSTEM AND USING METHOD THEREOF

FIELD OF TECHNOLOGY

The present disclosure relates to the field of energy storage technologies, and specifically, to a regenerative compressed air energy storage system and a using method thereof.

BACKGROUND

The power industry, as a social basic industry, is one of the lifeline industries of national development. With the rapid development of the domestic economy, the demand for electricity is also growing, and thus the difference between peak and valley loads of power grids is gradually widening. An energy storage technology is a critical technology to solve such problems as small capacity and high load fluctuation of distributed energy systems, and is of great significance for the development and improvement of the energy storage structure of the power grids.

A compressed air energy storage system is a widely used energy storage technology. The main principle of the compressed air energy storage system is to store the surplus power at a valley load period of the power system as energy and release it at a peak load period thereof so as to drive an expander to generate electricity. The compressed air energy storage system has such advantages of large capacity, low cost, high safety and reliable operation and is particularly suitable for providing peaking service and capacity backup for the power grid.

The main energy conversion equipment of the compressed air energy storage system comprises a compressor and an expander. The compressor and the expander are provided with pressure-loaded bearings, a high speed gear box and the like. Since these parts require oil lubrication and oil cooling during operation, and thus it must be ensured that an oil system is ready before the compressed air energy storage system operates. Normally, the oil system is allowed to start when the oil temperature of the lubrication station reaches 30 degrees Celsius or higher. However, due to the influence of the ambient temperature, the oil temperature of the lubrication station before starting is usually lower than the allowable starting temperature during most of the year and especially in winter, the lubrication station has a warm-up time of up to half an hour or even longer. However, when the peak-load regulation, especially deep peak-load regulation of the power grid is performed, the response time of a peak-load regulation unit is generally required to be on the order of several minutes. If the response speed of the system is slow, it is impossible to provide high-quality capacity support for the power grid and its technical competitiveness and economy will be greatly compromised. It is obvious that the existing compressed air energy storage system should be optimized to meet the response speed of the grid dispatching better.

SUMMARY

The present disclosure is intended to solve the technical problem that the compressed air energy storage system in the prior art has a slow response speed.

In order to solve the above problems, the present disclosure provides a regenerative compressed air energy storage system. The system comprises an air storage chamber, a compressor unit, an expander unit, a compressor unit lubrication station, an expander unit lubrication station, and an electric motor and a generator connected to the compressor unit and the expander unit, respectively, wherein a heating pipe and a temperature sensor are disposed inside each of the compressor unit lubrication station and the expander unit lubrication station;

an outlet of the compressor unit communicates with an inlet of the air storage chamber sequentially through the high-temperature sides of a high-temperature heat exchanger and a medium-temperature heat exchanger, and an outlet of the air storage chamber communicates with an inlet of the expander unit sequentially through a regulating valve and the low-temperature sides of a medium-temperature regenerator and a high-temperature regenerator;

the low-temperature side of the high-temperature heat exchanger, a high-temperature heat reservoir, a first valve, the high-temperature side of the high-temperature regenerator, a high-temperature cold reservoir and a second valve are connected in sequence end to end to form a high-temperature regenerative loop; the low-temperature side of the medium-temperature heat exchanger, a medium-temperature heat reservoir, a third valve, the high-temperature side of the medium-temperature regenerator, a medium-temperature cold reservoir and a fourth valve are connected in sequence end to end to form a medium-temperature regenerative loop;

the compressor unit lubrication station, a compressor unit oil pump, an oil way inside the compressor unit and the high-temperature side of a compressor unit oil cooler are connected in sequence end to end to form a first oil circulation loop; a heating pipe inlet inside the compressor unit lubrication station communicates with an outlet of the high-temperature cold reservoir through a high-temperature valve, and a heating pipe outlet communicates with an inlet of an intermediate cold reservoir, an outlet of the intermediate cold reservoir communicates with a pipeline for connecting the high-temperature cold reservoir and the second valve; and the high-temperature valve is electrically connected with a temperature sensor inside the compressor unit lubrication station; and the expander unit lubrication station, an expander unit oil pump, an oil way inside the expander unit and the high-temperature side of an expander unit oil cooler are connected in sequence end to end to form a second oil circulation loop; a heating pipe inlet inside the expander unit lubrication station communicates with an outlet of the medium-temperature heat reservoir through a medium-temperature valve, and a heating pipe outlet communicates with an inlet of a medium-temperature cold reservoir, and the medium-temperature valve is electrically connected with a temperature sensor inside the expander unit lubrication station.

In an embodiment of the present disclosure, an inlet and an outlet at the low-temperature side of the compressor unit oil cooler communicates with an outlet of the medium-temperature cold reservoir and an inlet of the medium-temperature heat reservoir, respectively.

In an embodiment of the present disclosure, the outlet of the medium-temperature cold reservoir communicates with the inlet at the low-temperature side of the compressor unit oil cooler through a first circulation pump.

In an embodiment of the present disclosure, an inlet and an outlet at the low-temperature side of the expander unit oil cooler communicates with the outlet of the medium-temperature cold reservoir and the inlet of the medium-temperature heat reservoir, respectively.

In an embodiment of the present disclosure, the outlet of the medium-temperature cold reservoir communicates with the inlet at the low-temperature side of the expander unit oil cooler through a second circulation pump.

In an embodiment of the present disclosure, the highest point of the heating pipe inside the compressor unit lubrication station is lower than the operating liquid level of the high-temperature cold reservoir and the lowest point of the heating pipe inside the compressor unit lubrication station is higher than the operating liquid level of the intermediate cold reservoir.

In an embodiment of the present disclosure, the highest point of the heating pipe inside the expander unit lubrication station is lower than the operating liquid level of the medium-temperature heat reservoir and the lowest point of the heating pipe inside the expander unit lubrication station is higher than the operating liquid level of the medium-temperature cold reservoir.

In an embodiment of the present disclosure, the outlets of the medium-temperature heat reservoir and the medium-temperature cold reservoir each communicates with an inlet of the high-temperature heat exchanger.

In order to solve the problems above, the present disclosure also provides a using method of a regenerative compressed air energy storage system, the method comprises the following steps at the energy storage stage:

S1.1, acquiring the oil temperature of a compressor unit lubrication station, and proceeding to the step S1.2;

S1.2, judging whether the oil temperature of the compressor unit lubrication station is less than a first temperature threshold or not, if the oil temperature of the compressor unit lubrication station is less than the first temperature threshold, then proceeding to the step S1.1, and if the oil temperature of the compressor unit lubrication station is not less than the first temperature threshold, then proceeding to the step S1.3;

S1.3, starting an electric motor and a compressor unit oil pump, opening a second valve and a fourth valve, closing a first valve and a third valve, and proceeding to the step S1.4;

S1.4, acquiring the oil temperature of an expander unit lubrication station, and proceeding to the step S1.5;

S1.5, judging whether the oil temperature of the expander unit lubrication station is less than a second temperature threshold or not, if the oil temperature of the expander unit lubrication station is less than the second temperature threshold, then proceeding to the step S1.6, and if the oil temperature of the expander unit lubrication station is not less than the second temperature threshold, then proceeding to the step S1.7;

S1.6, opening a medium-temperature valve, regulating the opening of the medium-temperature valve to be 100%, and proceeding to the step S1.4;

S1.7, judging whether the oil temperature of the expander unit lubrication station reaches a third temperature threshold or not, if the oil temperature of the expander unit lubrication station reaches the third temperature threshold, then proceeding to the step S1.8, and if the oil temperature of the expander unit lubrication station does not reach the third temperature threshold, then proceeding to the step S1.6, wherein the third temperature threshold is greater than the second temperature threshold;

S1.8, regulating the opening of the medium-temperature valve to be 50%, and proceeding to the step S1.9;

S1.9 acquiring the oil temperature of the expander unit lubrication station, and proceeding to the step S1.10;

S1.10, calculating the change rate of the oil temperature of the expander unit lubrication station, and proceeding to the step S1.11;

S1.11, judging whether the change rate of the oil temperature of the expander unit lubrication station is equal to zero, if the change rate of the oil temperature of the expander unit lubrication station is equal to zero, then proceeding to the step S1.9, and if the change rate of the oil temperature of the expander unit lubrication station is not equal to zero, then proceeding to the step S1.12;

S1.12, judging whether the change rate of the oil temperature of the expander unit lubrication station is greater than zero, if the change rate of the oil temperature of the expander unit lubrication station is greater than zero, then proceeding to the step S1.13, and if the change rate of the oil temperature of the expander unit lubrication station is not greater than zero, then proceeding to the step S1.14;

S1.13, decreasing the opening of the medium-temperature valve by 1% per minute, and proceeding to the step S1.9; and S1.14, increasing the opening of the medium-temperature valve by 1% per minute and proceeding to the step S1.9;

the method comprises the following steps at the energy release stage:

S2.1, acquiring the oil temperature of the expander unit lubrication station, and proceeding to the step S2.2;

S2.2, judging whether the oil temperature of the expander unit lubrication station is less than a second temperature threshold or not, if the oil temperature of the expander unit lubrication station is less than the second temperature threshold, then proceeding to the step S2.1, if the oil temperature of the expander unit lubrication station is not less than the second temperature threshold, then proceeding to the step S2.3;

S2.3, starting an expander unit oil pump, opening a regulating valve, the first valve and the third valve, closing the second valve and the fourth valve, and proceeding to the step S2.4;

S2.4, acquiring the oil temperature of the compressor unit lubrication station, and proceeding to the step S2.5;

S2.5, judging whether the oil temperature of the compressor unit lubrication station is less than a first temperature threshold or not, if the oil temperature of the compressor unit lubrication station is less than the first temperature threshold, then proceeding to the step S2.6, and if the oil temperature of the compressor unit lubrication station is not less than the first temperature threshold, then proceeding to the step S2.7;

S2.6, opening a high-temperature valve, regulating the opening of the high-temperature valve to be 100%, and proceeding to the step S2.4;

S2.7, judging whether the oil temperature of the compressor unit lubrication station reaches a fourth temperature threshold or not, if the oil temperature of the compressor unit lubrication station reaches the fourth temperature threshold, then proceeding to the step S2.8, and if the oil temperature of the compressor unit lubrication station does not reach the fourth temperature threshold, then proceeding to the step S2.6, wherein the fourth temperature threshold is greater than the first temperature threshold;

S2.8, regulating the opening of the high-temperature valve to be 50% and then proceeding to the step S2.9;

S2.9 acquiring the oil temperature of the compressor unit lubrication station, and proceeding to the step S2.10;

S2.10, calculating the change rate of the oil temperature of the compressor unit lubrication station, and proceeding to the step S2.11;

S2.11, judging whether the change rate of the oil temperature of the compressor unit lubrication station is equal to zero, if the change rate of the oil temperature of the compressor unit lubrication station is equal to zero, then proceeding to the step S2.9, and if the change rate of the oil temperature of the compressor unit lubrication station is not equal to zero, then proceeding to the step S2.12;

S2.12, judging whether the change rate of the oil temperature of the compressor unit lubrication station is greater than zero, if the change rate of the oil temperature of the compressor unit lubrication station is greater than zero, then proceeding to the step S2.13, and if the change rate of the oil temperature of the compressor unit lubrication station is not greater than zero, then proceeding to the step S2.14;

S2.13, decreasing the opening of the high-temperature valve by 1% per minute and proceeding to the step S2.9; and S2.14, increasing the opening of the high-temperature valve by 1% per minute and proceeding to the step S2.9.

The present disclosure has the advantages of simple structure and convenient operation. At the energy storage stage, by preheating the lubricating oil in the expander unit lubrication station using the medium-temperature regenerative working medium in the medium-temperature heat reservoir and regulating the opening of the medium-temperature valve in real time using the temperature sensor in the expander unit lubrication station, it can be ensured not only that the oil temperature of the expander unit lubrication station can rapidly satisfy the starting condition of the expander unit at the energy release stage but also that the oil temperature of the expander unit lubrication station is always maintained within a specified temperature range. Simultaneously, at the energy release stage, by preheating the lubricating oil in the compressor unit lubrication station using the high-temperature regenerative working medium in the high-temperature clod reservoir and regulating the opening of the high-temperature valve in real time using the temperature sensor inside the compressor unit lubrication station, it can be ensured not only that the oil temperature of the compressor unit lubrication station can rapidly satisfy the starting condition of the compressor unit at the energy storage stage but also that the oil temperature of the compressor unit lubrication station is always maintained within a specified temperature range. According to the regenerative compressed air energy storage system, rapid responses at both the energy storage and energy release stages can be achieved, and the expander unit lubrication station and the compressor unit lubrication station can be heated without the consumption of external thermal energy.

DESCRIPTION OF THE REFERENCE NUMBERS

| | |
|---|---|
| 1-1 electric motor | 1-2 compressor unit |
| 1-3 compressor unit lubrication station | 1-4 compressor unit oil pump |
| 1-5 compressor unit oil cooler | 1-6 high-temperature valve |
| 2-1 generator | 2-2 expander unit |
| 2-3 expander unit lubrication station | 2-4 expander unit oil |
| 2-5 expander unit oil cooler | 2-6 medium-temperature valve |
| 3 high-temperature heat exchanger | 4 high-temperature heat reservoir |
| 5 first valve | 6 high-temperature regenerator |
| 7 high-temperature cold reservoir | 8 intermediate cold reservoir |
| 9 second valve | 10 medium-temperature heat exchanger |
| 11 medium-temperature heat reservoir | 12 third valve |
| 13 medium-temperature regenerator | 14 medium-temperature cold reservoir |
| 15 fourth valve | 16 air storage chamber |
| 17 regulating valve | 3I inlet of high-temperature heat |
| 11O outlet of the medium-temperature exchanger heat reservoir | |
| 14O outlet medium-temperature cold reservoir | |

DESCRIPTION OF THE EMBODIMENTS

In order to make the objects, the technical solutions and the advantages of the present disclosure more clear, the technical solutions of the present disclosure will be clearly described below in conjunction with the drawings. It is obvious that the described embodiments are a part of and not all of the embodiments of the present disclosure. All other embodiments obtained by a person skill in the art based on the embodiments of the present disclosure fall within the protective scope of the present disclosure.

It should be noted that, the term "connected" shall be understood broadly, for example, it may be fixedly connected, detachably connected, or an integrally connected; it may be directly connected or indirectly connected through an intervening element unless otherwise specifically indicated and defined. The specific meaning of the terms above in the present disclosure can be understood in the specific circumstances by those skilled in the art.

Embodiment 1

Figure 1:
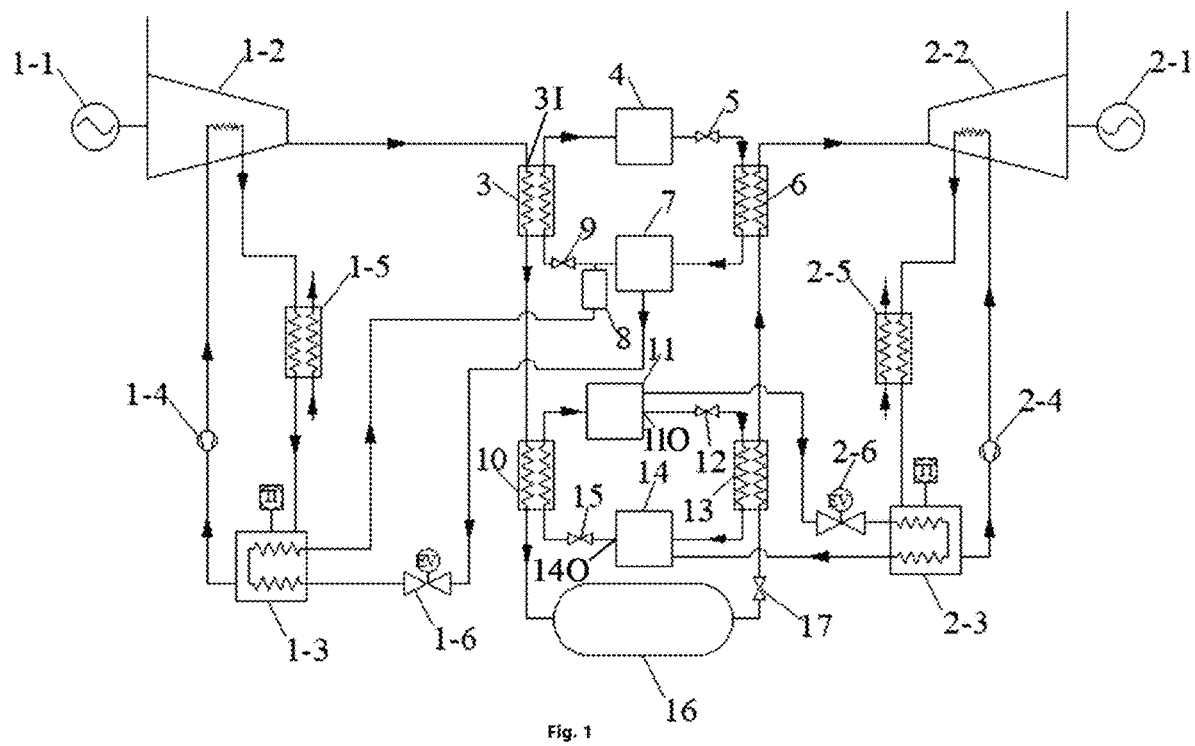
FIG. 1 is a schematic structural view of a regenerative compressed air energy storage system according to a first embodiment of the present disclosure.

As shown in FIG. 1, the present disclosure provides a regenerative compressed air energy storage system comprising an air storage chamber 16, a compressor unit 1-2, an expander unit 2-2, a compressor unit lubrication station 1-3, an expander unit lubrication station 2-3, and an electric motor 1-1 and a generator 2-1 connected to the compressor unit 1-2 and the expander unit 2-2, respectively, wherein a heating pipe and a temperature sensor are disposed inside each of the compressor unit lubrication station 1-3 and the expander unit lubrication station 2-3, the lubrication station comprising a oil tank;

an outlet of the compressor unit 1-2 communicates with an inlet of the air storage chamber 16 sequentially through the high-temperature sides of a high-temperature heat exchanger 3 and a medium-temperature heat exchanger 10, and an outlet of the air storage chamber 16 communicates with an inlet of the expander unit 2-2 sequentially through a regulating valve 17 and the low-temperature sides of a medium-temperature regenerator 13 and a high-temperature regenerator 16;

the low-temperature side of the high-temperature heat exchanger 3, a high-temperature heat reservoir 4, a first valve 5, the high-temperature side of the high-temperature regenerator 6, a high-temperature cold reservoir 7 and a second valve 9 are connected in sequence end to end to form a high-temperature regenerative loop; the low-temperature side of the medium-temperature heat exchanger 10, a medium-temperature heat reservoir 11, a third valve 12, the high-temperature side of the medium-temperature regenerator 13, a medium-temperature cold reservoir 14 and a fourth valve 15 are connected in sequence end to end to form a medium-temperature regenerative loop;

the compressor unit lubrication station 1-3, a compressor unit oil pump 1-4, an oil way inside the compressor unit 1-2 and the high-temperature side of a compresor unit oil cooler 1-5 are connected in sequence end to end to form a first oil circulation loop; a heating pipe inlet inside the compressor unit lubrication station 1-3 communicates with an outlet of the high-temperature cold reservoir 7 through a high-temperature valve 1-6, and a heating pipe outlet communicates with an inlet of an intermediate cold reservoir 8; an outlet of the intermediate cold reservoir 8 communicates with a pipeline for connecting the high-temperature cold reservoir 7 and the second valve 9; and the high-temperature valve 1-6 is electrically connected with the temperature sensor inside the compressor unit lubrication station 1-3; and the expander unit lubrication station 2-3, an expander unit oil pump 2-4, an oil way inside the expander unit 2-2 and the high-temperature side of an expander unit oil cooler 2-5 are connected in sequence end to end to form a second oil circulation loop; a heating pipe inlet inside the expander unit lubrication station 2-3 communicates with an outlet of the medium-temperature heat reservoir 11 through a medium-temperature valve 2-6, and a heating pipe outlet communicates with an inlet of a medium-temperature cold reservoir 14; and the medium-temperature valve 2-6 is electrically connected with the temperature sensor inside the expander unit lubrication station 2-3.

Therefore, at the compressor unit side, the temperature sensor detects the oil temperature of the compressor unit lubrication station 1-3 in real time, and when the oil temperature of the compressor unit lubrication station 1-3 satisfies the starting condition of the compressor unit 1-2, that is, when the oil temperature of the compressor unit lubrication station 1-3 is not lower than a minimum temperature threshold and not higher than a maximum temperature threshold (generally, there is no case of exceeding the maximum temperature threshold), the compressor unit oil pump 1-4 is allowed to start at any time, that is, the compressor unit 1-2 can be rapidly started. And when the oil temperature of the compressor unit lubrication station 1-3 is lower than the minimum temperature threshold, the temperature sensor inside the compressor unit lubrication station 1-3 controls the high-temperature valve 1-6 to open, and regulates the opening of the high-temperature valve 1-6 to a first specified opening, for example 100%. At this time, a part of high-temperature regenerative working medium stored in the high-temperature cold reservoir 7 sequentially passes through the high-temperature valve 1-6 and the heating pipe in the compressor unit tank 1-3 and flows into the intermediate cold reservoir 8. Since the oil temperature of the compressor unit lubrication station 1-3 is much lower than the temperature of the high-temperature regenerative working medium in the high-temperature cold reservoir 7, the high-temperature regenerative working medium continuously transfers heat to the lubricating oil in the compressor unit lubrication station 1-3 through heat conduction, convection, and the like when the high-temperature regenerative working medium flows through the compressor unit lubrication station 1-3. When the oil temperature of the compressor unit lubrication station 1-3 reaches the maximum temperature threshold, the temperature sensor inside the compressor unit lubrication station 1-3 controls the high-temperature valve 1-6 to decrease the opening thereof to a second specified opening, for example 50%. Thereafter, if the oil temperature of the compressor unit lubrication station 1-3 is still in an upward trend, that is, the change rate of the oil temperature is greater than zero, the temperature sensor inside the compressor unit lubrication station 1-3 controls the high-temperature valve 1-6 to decrease the opening thereof by 1% per minute; if the oil temperature of the compressor unit lubrication station 1-3 is in a downward trend, that is, the change rate of the oil temperature is less than zero, the temperature sensor inside the compressor unit lubrication station 1-3 controls the high-temperature valve 1-6 to increase the opening thereof by 1% per minute so as to ensure that the oil temperature of the compressor unit lubrication station 1-3 is always between the minimum temperature threshold and the maximum temperature threshold, so that the oil temperature of the compressor unit 1-2 can rapidly satisfy the starting condition of the compressor unit 1-2 at the energy storage stage.

At this time, the electric motor 1-1 and the compressor unit oil pump 1-4 can be started, and simultaneously the second valve 9 and the fourth valve 15 are opened, and the first valve 5 and the third valve 12 are closed. Therefore, the compressor unit oil pump 1-4 continuously pumps the lubricating oil in the compressor unit lubrication station 1-3 to the oil way inside the compressor unit 1-2 to cool and lubricate various parts inside the compressor unit 1-2. The warmed lubricating oil flows out of the compressor unit 1-2 and then flows into the high-temperature side of the compressor unit oil cooler 1-5 for being cooled. Having been cooled by the compressor unit oil cooler 1-5, the lubricating oil flows back to the compressor unit lubrication station 1-3 again. At the same time, under the driving of the electric motor 1-1, the compressor unit 1-2 will continuously compress the air flowing from its inlet into high-temperature and high-pressure compressed air, and the compressed air is discharged from the compressor unit 1-2 and then sequentially flows through the high-temperature sides of the high-temperature heat exchanger 3 and the medium-temperature heat exchanger 10 for exchanging heat and being cooled and flows into the air storage chamber 16. When the compressed air flows through the high-temperature side of the high-temperature heat exchanger 3, the high-temperature regenerative working medium flowing from the high-temperature cold reservoir 7 and the intermediate cold reservoir 8 to the low-temperature side of the high-temperature heat exchanger 3 will continuously absorb the heat of the compressed air, and the warmed high-temperature regenerative working medium flows out of the high-temperature heat exchanger 3 and is stored in the high-temperature heat reservoir 4 for use in the energy release stage. When the compressed air flows through the high-temperature side of the medium-temperature heat exchanger 10, medium-temperature regenerative working medium flowing from the medium-temperature cold reservoir 14 to the low-temperature side of the medium-temperature heat exchanger 10 will continuously absorb the heat of the compressed air, and the warmed medium-temperature regenerative working medium flows out of the medium-temperature heat exchanger 10 and is stored in the medium-temperature heat reservoir 11 for use in the energy release stage.

Similarly, at the expander unit side, the temperature sensor detects the oil temperature of the expander unit lubrication station 2-3 in real time, and when the oil temperature of the expander unit lubrication station 2-3 is lower than the minimum temperature threshold, the temperature sensor inside the expander unit lubrication station 2-3 controls the medium-temperature valve 2-6 to open, and regulates the opening of the medium-temperature valve 2-6 to a third specified opening, for example 100%. At this time, a part of medium-temperature regenerative working medium stored in the medium-temperature heat reservoir 11 sequentially passes through medium-temperature valve 2-6 and the heating pipe in the expander unit tank 2-3 and flows into the medium-temperature cold reservoir 14. Since the oil temperature of the expander unit lubrication station 2-3 is much lower than the temperature of the medium-temperature regenerative working medium in the medium-temperature heat reservoir 11, the medium-temperature regenerative working medium continuously transfers heat to the lubricating oil in the expander unit lubrication station 2-3 through heat conduction, convection, and the like when the medium-temperature regenerative working medium flows through the expander unit lubrication station 2-3. When the oil temperature of the expander unit lubrication station 2-3 reaches the maximum temperature threshold, the temperature sensor inside the expander unit lubrication station 2-3 controls the medium-temperature valve 2-6 to decrease the opening thereof to a fourth specified opening, for example 50%. Thereafter, if the oil temperature of the expander unit lubrication station 2-3 is still in an upward trend, that is, the change rate of the oil temperature is greater than zero, the temperature sensor inside the expander unit lubrication station 2-3 controls the medium-temperature valve 2-6 to decrease the opening thereof by 1% per minute; if the oil temperature of the expander unit lubrication station 2-3 is in a downward trend, that is, the change rate of the oil temperature is less than zero, the temperature sensor inside the expander unit lubrication station 2-3 controls the medium-temperature valve 2-6 to increase the opening thereof by 1% per minute so as to ensure that the oil temperature of the expander unit lubrication station 2-3 is always between the minimum temperature threshold and the maximum temperature threshold, so that the oil temperature of the expander unit 2-2 can rapidly satisfy the starting condition of the expander unit 2-2 at the energy release stage.

At this time, the system can rapidly start the expander unit oil pump 2-4 to enter the energy storage stage when the power generation command is received. Therefore, the expander unit oil pump 2-4 continuously pumps the lubricating oil in the expander unit lubrication station 2-3 to the oil way inside the expander unit 2-2 to cool and lubricate various parts inside the expander unit 2-2. The warmed lubricating oil flows out of the expander unit 2-2 and then flows into the high-temperature side of the expander unit oil cooler 2-5 for being cooled. Having been cooled by the expander unit oil cooler 2-5, the lubricating oil flows back to the expander unit lubrication station 2-3 again. At the same time, after the regulating valve 17, the first valve 5 and the third valve 17 are opened and the second valve 9 and the fourth valve 15 are closed, compressed air stored in the air storage chamber 16 sequentially flows through the low-temperature sides of the medium-temperature regenerator 13 and the high-temperature regenerator 6 and then flows into the expander unit 2-2 for doing work. When the compressed air flows through the low-temperature side of the medium-temperature regenerator 13, the medium-temperature regenerative working medium flowing from the medium-temperature heat reservoir 11 to the high-temperature side of the medium-temperature regenerator 13 will continuously release its own heat to the compressed air, and the cooled medium-temperature regenerative working medium flows out of the medium-temperature regenerator 13, and is stored in the medium-temperature cold reservoir 14 for use in the energy storage stage. When the compressed air flows through the low-temperature side of the high-temperature regenerator 6, high-temperature regenerative working medium flowing from the high-temperature heat reservoir 4 into the high-temperature side of the high-temperature regenerator 6 will continuously release its own heat to the compressed air, and the cooled high-temperature regenerative working medium flows out of the high-temperature regenerator 6 and is stored in the high-temperature cold reservoir 7 for use in the energy storage stage.

As can be seen from the above, the present disclosure has the advantages of simple structure and convenient operation. At the energy storage stage, by preheating the lubricating oil in the expander unit lubrication station 2-3 using the medium-temperature regenerative working medium in the medium-temperature heat reservoir 11 and regulating the opening of the medium-temperature valve 2-6 in real time using the temperature sensor in the expander unit lubrication station 2-3, it can be ensured not only that the oil temperature of the expander unit lubrication station 2-3 can rapidly satisfy the starting condition of the expander unit 2-2 at the energy release stage but also that the oil temperature of the expander unit lubrication station 2-3 is always maintained within a specified temperature range. Simultaneously, at the energy release stage, by preheating the lubricating oil in the compressor unit lubrication station 1-3 using the high-temperature regenerative working medium in the high-temperature clod reservoir 7 and regulating the opening of the high-temperature valve 1-6 in real time using the temperature sensor in the compressor unit lubrication station 1-3, it can be ensured not only that the oil temperature of the compressor unit lubrication station 1-3 can rapidly satisfy the starting condition of the compressor unit 1-2 at the energy storage stage but also that the oil temperature of the compressor unit lubrication station 1-3 is always maintained within a specified temperature range. According to the regenerative compressed air energy storage system, rapid responses at both the energy storage and energy release stages can be achieved, and the expander unit lubrication station 2-3 and the compressor unit lubrication station 1-3 can be heated without the consumption of external thermal energy.

Figure 2:
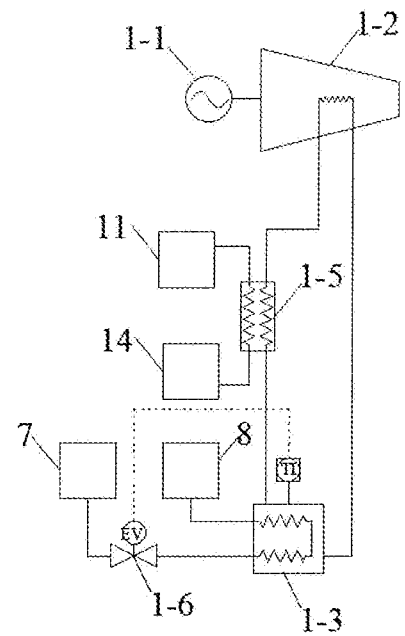
FIG. 2 is a schematic structural view of the first oil circulation loop according to the first embodiment of the present disclosure.

Preferably, as shown in FIG. 2, an inlet and an outlet at the low-temperature side of the expander unit oil cooler 1-5 communicates with an outlet of the medium-temperature cold reservoir 14 and an inlet of the medium-temperature heat reservoir 11, respectively. Therefore, at the energy storage stage, a part of the medium-temperature regenerative working medium stored in the medium-temperature cold reservoir 14 may be used to cool the lubricating oil flowing through the high-temperature side of the compressor unit oil cooler 1-5, and the warmed medium-temperature regenerative working medium flows out of the low-temperature side of the compressor unit oil cooler and is stored in the medium-temperature heat reservoir 11 for use in the energy release stage.

Further, the outlet of the medium-temperature cold reservoir 14 communicates with the inlet at the low-temperature side of the compressor unit oil cooler 1-5 through a first circulation pump.

Figure 3:
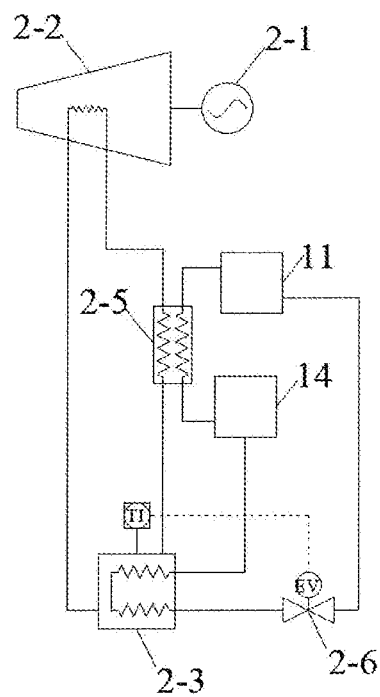
FIG. 3 is a schematic structural view of the second oil circulation loop according to the first embodiment of the present disclosure.

Preferably, as shown in FIG. 3, an inlet and an outlet at the low-temperature side of the expander unit oil cooler 2-5 communicates with the outlet of the medium-temperature cold reservoir 14 and the inlet of the medium-temperature heat reservoir 11, respectively. Therefore, at the energy release stage, a part of the medium-temperature regenerative working medium stored in the medium-temperature cold reservoir 14 may be used to cool the lubricating oil flowing through the high-temperature side of the expander unit oil cooler 2-5, and the warmed medium-temperature regenerative working medium flows out of the expander unit oil cooler 2-5 and is stored in the medium-temperature heat reservoir 11.

Further, the outlet of the medium-temperature cold reservoir 14 communicates with the inlet at the low-temperature side of the expander unit oil cooler 2-5 through a second circulation pump.

Preferably, the highest point of the heating pipe inside the compressor unit lubrication station 1-3 is lower than the operating liquid level of the high-temperature cold reservoir 7, and the lowest point of the heating pipe inside the compressor unit lubrication station 1-3 is higher than the operating liquid level of the intermediate cold reservoir 8. The benefits of this arrangement is in that since the differences in height exist both between the operating liquid level of the high-temperature cold reservoir 7 and the heating pipe inside the compressor unit lubrication station 1-3 and between the heating pipe inside the compressor unit lubrication station 1-3 and the operating liquid level of the intermediate cold reservoir 8, the high-temperature regenerative working medium stored in the high-temperature cold reservoir 7 automatically flows into the heating pipe inside the compressor unit lubrication station 1-3 under the action of gravity for exchanging heat and the heat-exchanged and cooled regenerative working medium will automatically flow into the intermediate cold reservoir 8 also under the action of gravity after the high-temperature valve 1-6 is opened. It should be noted that except the manner above, a driving pump can be directly disposed on the pipeline for connecting the high-temperature cold reservoir 7 and the compressor unit lubrication station 1-3, and the high-temperature regenerative working medium in the high-temperature cold reservoir 7 is pumped into the heating pipe inside the compressor unit lubrication station 1-3 by the driving pump.

Preferably, the highest point of the heating pipe inside the expander unit lubrication station 2-3 is lower than the operating liquid level of the medium-temperature heat reservoir 11, and the lowest point of the heating pipe inside the expander unit lubrication station 2-3 is higher than the operating liquid level of the medium-temperature cold reservoir 14. Similarly, since the differences in height exist both between the operating liquid level of the medium-temperature heat reservoir 11 and the heating pipe inside the expander unit lubrication station 2-3 and between the heating pipe inside the expander unit lubrication station 2-3 and the operating liquid level of the medium-temperature cold reservoir 14, the medium-temperature regenerative working medium stored in the medium-temperature heat reservoir 11 automatically flows into the heating pipe inside the expander unit lubrication station 2-3 under the action of gravity for exchanging heat and the heat-exchanged and cooled regenerative working medium will automatically flow into the medium-temperature cold reservoir 14 also under the action of gravity after the medium-temperature valve 2-6 is opened. It should be noted that except the manner above, a driving pump can be directly disposed on the pipeline for connecting the medium-temperature heat reservoir 11 and the expander unit lubrication station 2-3, and the medium-temperature regenerative working medium in the medium-temperature heat reservoir 11 is pumped into the heating pipe inside the expander unit lubrication station 2-3 by the driving pump.

Preferably, the outlets 11O, 14O of the medium-temperature heat reservoir 11 and the medium-temperature cold reservoir 14 each communicates with an inlet 3I of the high-temperature heat exchanger 3.

Embodiment 2

The present disclosure also provides a using method of a regenerative compressed air energy storage system.

Figure 4:
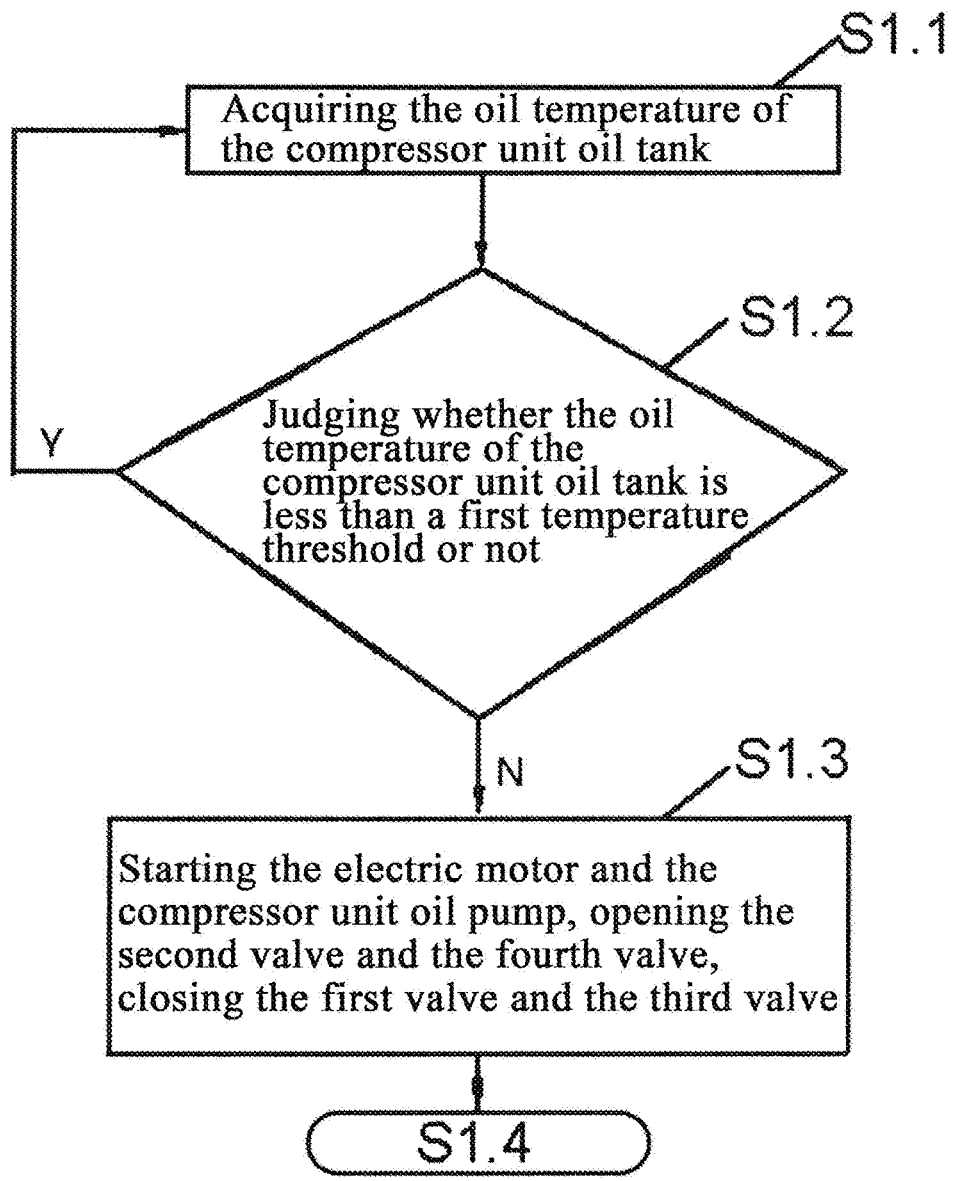
FIG. 4 is a flow chart showing a using method of the regenerative compressed air energy storage system at the energy storage stage according to a second embodiment of the present disclosure.
Figure 4:
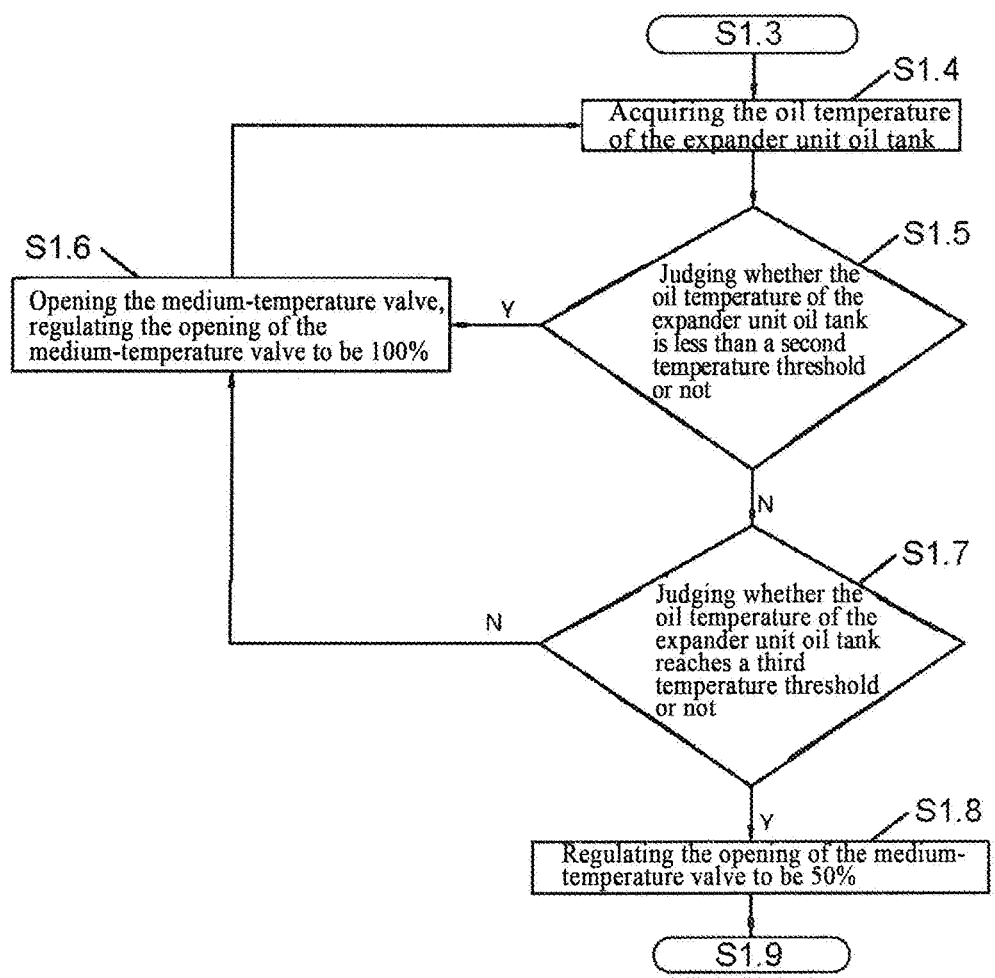
Figure 4:
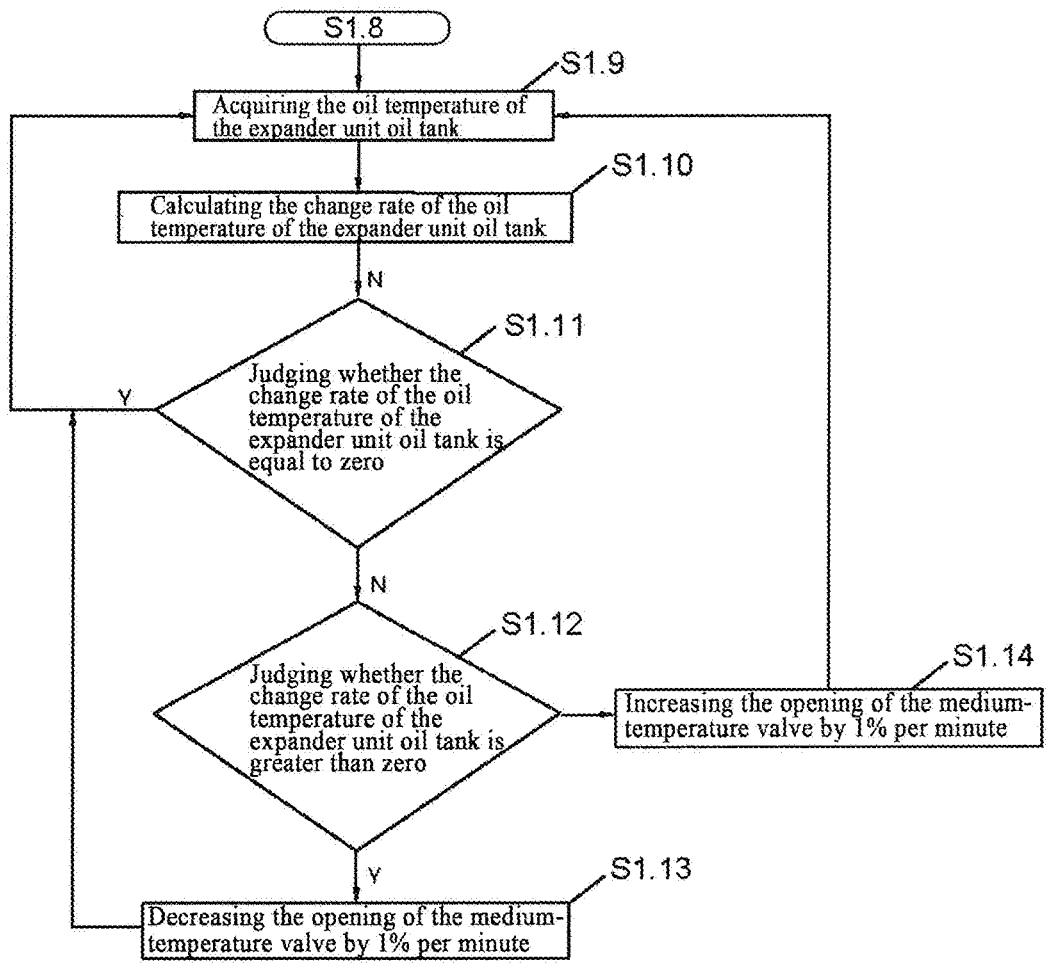

As shown in FIG. 4, the method comprises the following steps at the energy storage stage:

S1.1, acquiring the oil temperature of a compressor unit lubrication station 1-3, and proceeding to the step S1.2;

S1.2, judging whether the oil temperature of the compressor unit lubrication station 1-3 is less than a first temperature threshold or not, wherein when the oil temperature of the compressor unit lubrication station 1-3 is not less than the first temperature threshold, it is illustrated that the oil temperature of the compressor unit lubrication station 1-3 satisfies the starting condition of a compressor unit 1-2, performing the starting at this time, that is, proceeding to the step S1.3, and when the oil temperature of the compressor unit lubrication station 1-3 is less than the first temperature threshold, continuously detecting the oil temperature of the compressor unit lubrication station 1-3, that is, proceeding to the step S1.1;

S1.3, starting an electric motor 1-1 and a compressor unit oil pump 1-4, opening a second valve 9 and a fourth valve 15, closing a first valve 5 and a third valve 12, and proceeding to the step S1.4. At this time, under the driving of the electric motor 1-1, the compressor unit 1-2 will continuously compress the air flowing from its inlet into high-temperature and high-pressure compressed air, and the compressed air is discharged from the compressor unit 1-2 and then sequentially flows through the high-temperature sides of a high-temperature heat exchanger 3 and a medium-temperature heat exchanger 10 for exchanging heat and being cooled and then flows into an air storage chamber 16. When the compressed air flows through the high-temperature side of a high-temperature heat exchanger 3, high-temperature regenerative working medium of 90° C. flowing from a high-temperature cold reservoir 7 and an intermediate cold reservoir 8 to the low-temperature side of the high-temperature heat exchanger 3 will continuously absorb the heat of the compressed air, and the warmed high-temperature regenerative working medium of 340° C. flows out of the high-temperature heat exchanger 3 and is stored in a high-temperature heat reservoir 4 for use in the energy release stage. When the compressed air flows through the high-temperature side of the medium-temperature heat exchanger 10, medium-temperature regenerative working medium of 45C flowing from a medium-temperature cold reservoir 14 to the low-temperature side of the medium-temperature heat exchanger 10 will continuously absorb the heat of the compressed air, and the warmed medium-temperature regenerative working medium of 70° C. flows out of the medium-temperature heat exchanger 10 and is stored in a medium-temperature heat reservoir 11 for use in the energy release stage.

Figure 5:
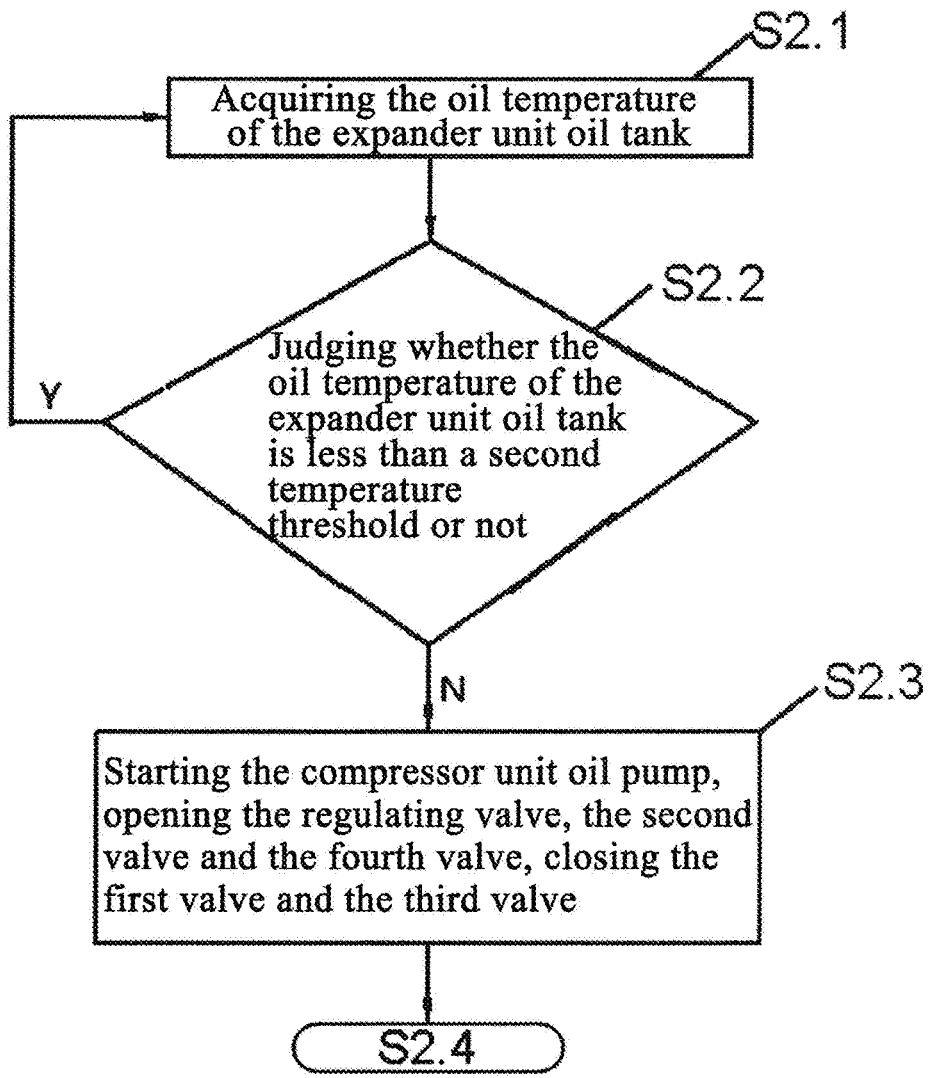
FIG. 5 is a flow chart showing a using method of the regenerative compressed air energy storage system at the energy release stage according to the second embodiment of the present disclosure.
Figure 5:
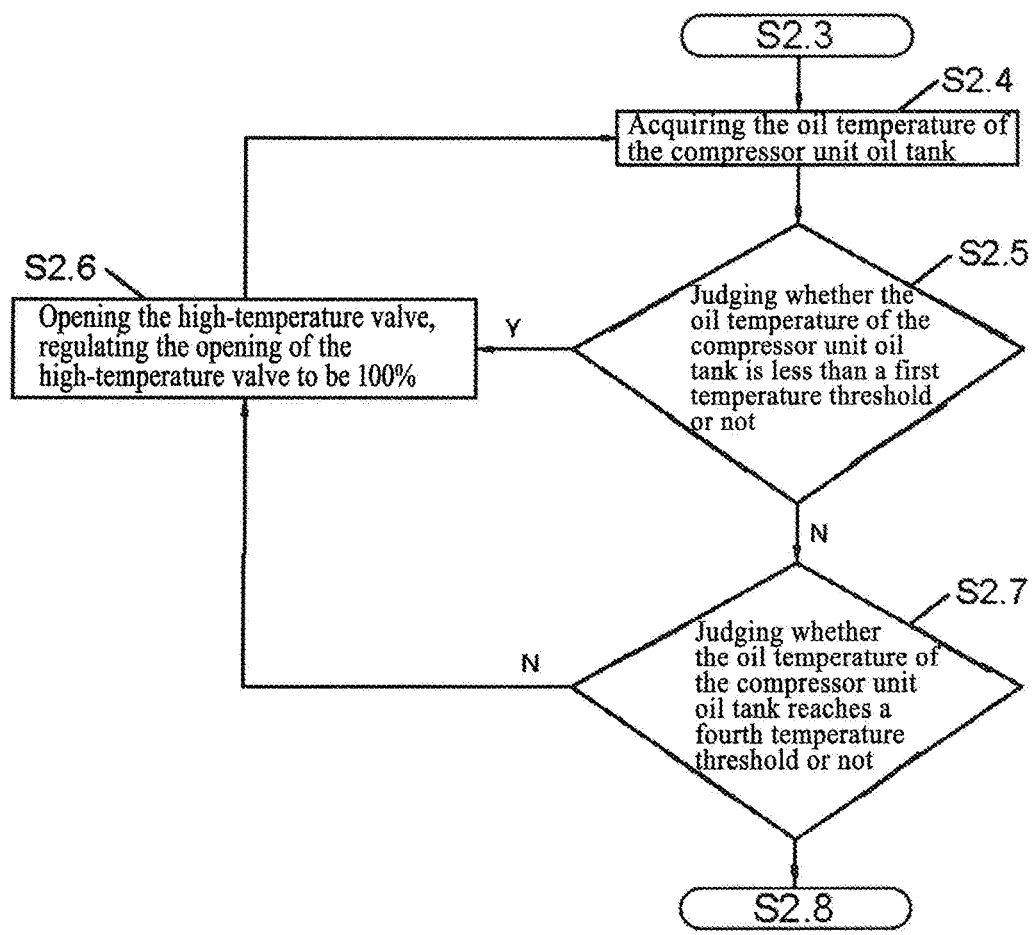
Figure 5:
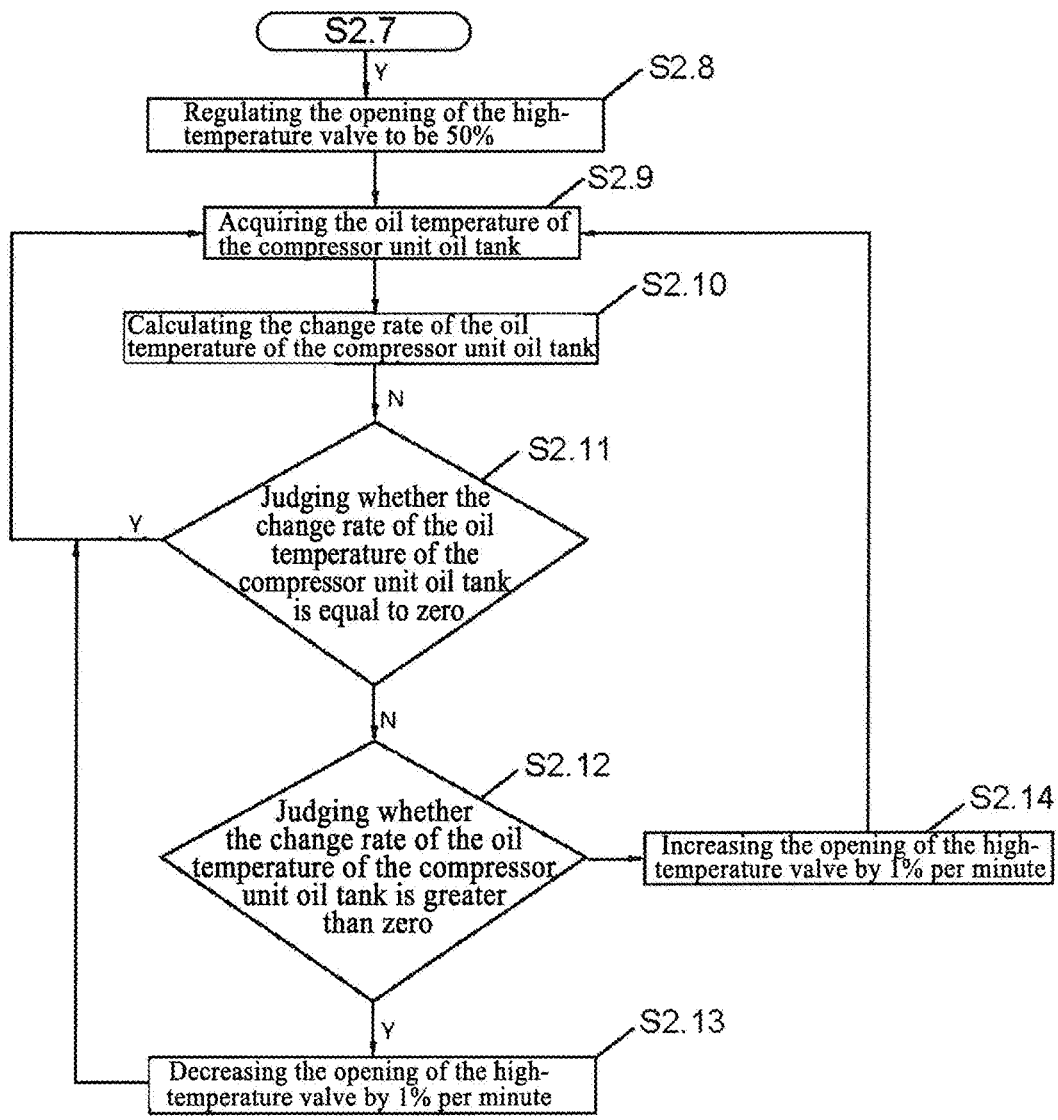

S1.4, acquiring the oil temperature of an expander unit lubrication station 2-3, and proceeding to the step S1.5;

S1.5, judging whether the oil temperature of the expander unit lubrication station 2-3 is less than a second temperature threshold or not, if the oil temperature of the expander unit lubrication station is less than the second temperature threshold, then proceeding to the step S1.6, and if the oil temperature of the expander unit lubrication station is not less than the second temperature threshold, then proceeding to the step S1.7;

S1.6, opening a medium-temperature valve 2-6, regulating the opening of the medium-temperature valve 2-6 to be 100%, at this time, a part of medium-temperature regenerative working medium stored in the medium-temperature heat reservoir 11 sequentially passes through the medium-temperature valve 2-6 and a heating pipe in the expander unit tank 2-3 and flows into the medium-temperature cold reservoir 14. Since the oil temperature of the expander unit lubrication station 2-3 is much lower than the temperature of the medium-temperature regenerative working medium in the medium-temperature heat reservoir 11, the medium-temperature regenerative working medium continuously transfers heat to the lubricating oil in the expander unit lubrication station 2-3 through heat conduction, convection, and the like when the medium-temperature regenerative working medium flows through the expander unit lubrication station 2-3. In order to ensure the oil temperature of the expander unit lubrication station 2-3 is always maintained between the second temperature threshold and a third temperature threshold, after the medium-temperature valve 2-6 is opened, it is necessary to detect the oil temperature of the expander unit lubrication station 2-3 in real time, that is, proceeding the step S1.4;

S1.7, judging whether the oil temperature of the expander unit lubrication station 2-3 reaches the third temperature threshold or not, if the oil temperature of the expander unit lubrication station 2-3 reaches the third temperature threshold, then it is necessary to decrease the flow of the medium-temperature regenerative working medium entering the expander unit lubrication station 2-3, that is, proceeding to the step S1.8, and if the oil temperature of the expander unit lubrication station 2-3 does not reach the third temperature threshold, then continuing to maintain the complete opening of the medium-temperature valve 2-6, that is, proceeding to the step S1.6, wherein the third temperature threshold is greater than the second temperature threshold;

S1.8, regulating the opening of the medium-temperature valve 2-6 to be 50% and proceeding to the step S1.9;

S1.9 acquiring the oil temperature of the expander unit lubrication station 2-3, and proceeding to the step S1.10;

S1.10, calculating the change rate of the oil temperature of the expander unit lubrication station 2-3, and proceeding to the step S1.11;

S1.11, judging whether the change rate of the oil temperature of the expander unit lubrication station 2-3 is equal to zero, if the change rate of the oil temperature of the expander unit lubrication station 2-3 is equal to zero, then proceeding to the step S1.9, and if the change rate of the oil temperature of the expander unit lubrication station 2-3 is not equal to zero, then proceeding to the step S1.12;

S1.12, judging whether the change rate of the oil temperature of the expander unit lubrication station 2-3 is greater than zero, if the change rate of the oil temperature of the expander unit lubrication station 2-3 is greater than zero, then proceeding to the step S1.13, and if the change rate of the oil temperature of the expander unit lubrication station 2-3 is not greater than zero, then proceeding to the step S1.14;

S1.13, decreasing the opening of the medium-temperature valve 2-6 by 1% per minute and proceeding to the step S1.9; and S1.14, increasing the opening of the medium-temperature valve 2-6 by 1% per minute and proceeding to the step S1.9;

As shown in FIG. 5, the method comprises the following steps at the energy release stage;

S2.1, acquiring the oil temperature of the expander unit lubrication station 2-3, and proceeding to the step S2.2;

S2.2, judging whether the oil temperature of the expander unit lubrication station 2-3 is less than the second temperature threshold or not, wherein when the oil temperature of the expander unit lubrication station 2-3 is not less than the second temperature threshold, it is illustrated that the oil temperature of the expander unit lubrication station 2-3 satisfies the starting condition of the expander unit 2-2, performing the starting at this time, that is, proceeding to the step S2.3, and when the oil temperature of the expander unit lubrication station 2-3 is less than the second temperature threshold, continuing the detection of the oil temperature of the expander unit lubrication station 2-3, that is, proceeding to the step S2.1;

S2.3, starting an expander unit oil pump 2-3, opening a regulating valve 17, the first valve 5 and the third valve 12, closing the second valve 9 and the fourth valve 15, and proceeding to the step S2.4; at this time, compressed air stored in the air storage chamber 16 sequentially flows through the low-temperature sides of a medium-temperature regenerator 13 and a high-temperature regenerator 6 and then flows into the expander unit 2-2 for doing work. When the compressed air flows through the low-temperature side of the medium-temperature regenerator 13, medium-temperature regenerative working medium of 70° C. flowing from the medium-temperature heat reservoir 11 to the high-temperature side of the medium-temperature regenerator 13 will continuously release its own heat to the compressed air, and the cooled medium-temperature regenerative working medium of 45° C. flows out of the medium-temperature regenerator 13 and is stored in the medium-temperature cold reservoir 14 for use in the energy storage stage. When the compressed air flows through the low-temperature side of the high-temperature regenerator 6, high-temperature regenerative working medium of 340° C. flowing from the high-temperature heat reservoir 4 into the high-temperature side of the high-temperature regenerator 6 will continuously release its own heat to the compressed air, and the cooled high-temperature regenerative working medium of 90° C. flows out of the high-temperature regenerator 6 and is stored in the high-temperature cold reservoir 7 for use in the energy storage stage.

S2.4, acquiring the oil temperature of the compressor unit lubrication station 1-3, and proceeding to the step S2.5;

S2.5, judging whether the oil temperature of the compressor unit lubrication station 1-3 is less than the first temperature threshold or not, if the oil temperature of the compressor unit lubrication station 1-3 is less than the first temperature threshold, then proceeding to the step S2.6, and if the oil temperature of the compressor unit lubrication station 1-3 is not less than the first temperature threshold, then proceeding to the step S2.7;

S2.6, opening a high-temperature valve 1-6, regulating the opening of the high-temperature valve 1-6 to be 100%, at this time, a part of high-temperature regenerative working medium stored in the high-temperature cold reservoir 7 sequentially passes through the high-temperature valve 1-6 and a heating pipe in the compressor unit tank 1-3 and flows into the intermediate cold reservoir 8. Since the oil temperature of the compressor unit lubrication station 1-3 is much lower than the temperature of the high-temperature regenerative working medium in the high-temperature cold reservoir 7, the high-temperature regenerative working medium continuously transfers heat to the lubricating oil in the compressor unit lubrication station 1-3 through heat conduction, convection, and the like when the high-temperature regenerative working medium flows through the compressor unit lubrication station 1-3. In order to ensure the oil temperature of the compressor unit lubrication station 1-3 is always maintained between the first temperature threshold and a fourth temperature threshold, after the high-temperature valve 1-6 is opened, it is necessary to detect the oil temperature of the compressor unit lubrication station 1-3 in real time, that is, proceeding to the step S2.4;

S2.7, judging whether the oil temperature of the compressor unit lubrication station 1-3 reaches the fourth temperature threshold or not, if the oil temperature of the compressor unit lubrication station 1-3 reaches the fourth temperature threshold, then it is necessary to decrease the flow of the high-temperature regenerative working medium entering the compressor unit lubrication station 1-3, that is, proceeding to the step S2.8, and if the oil temperature of the compressor unit lubrication station 1-3 does not reach the fourth temperature threshold, then continuing to maintain the complete opening of the high-temperature valve 1-6, that is, proceeding to the step S2.6, wherein the fourth temperature threshold is greater than the first temperature threshold;

S2.8, regulating the opening of the high-temperature valve 2-6 to be 50% and proceeding to the step S2.9;

S2.9 acquiring the oil temperature of the compressor unit lubrication station 1-3, and proceeding to the step S2.10;

S2.10, calculating the change rate of the oil temperature of the compressor unit lubrication station 1-3, and proceeding to the step S2.11;

S2.11, judging whether the change rate of the oil temperature of the compressor unit lubrication station 1-3 is equal to zero, if the change rate of the oil temperature of the compressor unit lubrication station 1-3 is equal to zero, then proceeding to the step S2.9, and if the change rate of the oil temperature of the compressor unit lubrication station 1-3 is not equal to zero, then proceeding to the step S2.12;

S2.12, judging whether the change rate of the oil temperature of the compressor unit lubrication station 1-3 is greater than zero, if the change rate of the oil temperature of the compressor unit lubrication station 1-3 is greater than zero, then proceeding to the step S2.13, and if the change rate of the oil temperature of the compressor unit lubrication station 1-3 is not greater than zero, then proceeding to the step S2.14;

S2.13, decreasing the opening of the high-temperature valve 1-6 by 1% per minute and proceeding to the step S2.9; and S2.14, increasing the opening of the high-temperature valve 1-6 by 1% per minute and proceeding to the step S2.9.

It should be noted that, the first temperature threshold and the second temperature threshold may be the same value, and the third temperature threshold and the fourth temperature threshold may also be the same value. When both the first temperature threshold and the second temperature threshold are 30° C. and both the third temperature threshold and the fourth temperature threshold are 31° C., by the method above, the oil temperature of the compressor unit lubrication station 1-3 can be maintained between 30° C. and 31° C., while the oil temperature of the expander unit lubrication station 2-3 can also be maintained between 30° C. and 31° C.

Finally, it should be noted that the embodiments above are merely illustrative of the technical solutions of the present disclosure, and are not intended to be limiting; although the present disclosure has been described in detail with reference to the foregoing embodiments, a person skilled in the art will understand that modifications may be made to the technical solutions described in the various foregoing embodiments, or equivalent replacements may be made to some of the technical features thereof. These modifications or replacements do not cause the nature of the corresponding technical solution to deviate from the spirit and scope of the technical solutions of the various embodiments according to the present disclosure.

What is claimed is:

1. A regenerative compressed air energy storage system, comprising an air storage chamber, a compressor unit, an expander unit, a compressor unit lubrication station, an expander unit lubrication station, and an electric motor connected to the compressor unit and a generator connected to the expander unit, wherein a heating pipe and a temperature sensor are disposed inside each of the compressor unit lubrication station and the expander unit lubrication station;

an outlet of the compressor unit communicates with an inlet of the air storage chamber sequentially through the high-temperature sides of a high-temperature heat exchanger and a medium-temperature heat exchanger, and an outlet of the air storage chamber communicates with an inlet of the expander unit sequentially through a regulating valve and the low-temperature sides of a medium-temperature regenerator and a high-temperature regenerator;

the low-temperature side of the high-temperature heat exchanger, a high-temperature heat reservoir, a first valve, the high-temperature side of the high-temperature regenerator, a high-temperature cold reservoir and a second valve are connected in sequence end to end to form a high-temperature regenerative loop; the low-temperature side of the medium-temperature heat exchanger, a medium-temperature heat reservoir, a third valve, the high-temperature side of the medium-temperature regenerator, a medium-temperature cold reservoir and a fourth valve are connected in sequence end to end to form a medium-temperature regenerative loop;

the compressor unit lubrication station, a compressor unit oil pump, an oil way inside the compressor unit and the high-temperature side of a compressor unit oil cooler are connected in sequence end to end to form a first oil circulation loop; a heating pipe inlet inside the compressor unit lubrication station communicates with an outlet of the high-temperature cold reservoir through a high-temperature valve, and a heating pipe outlet communicates with an inlet of an intermediate cold reservoir; an outlet of the intermediate cold reservoir communicates with a pipeline for connecting the high-temperature cold reservoir and the second valve; and the high-temperature valve is electrically connected with the temperature sensor inside the compressor unit lubrication station; and the expander unit lubrication station, an expander unit oil pump, an oil way inside the expander unit and the high-temperature side of an expander unit oil cooler are connected in sequence end to end to form a second oil circulation loop; a heating pipe inlet inside the expander unit lubrication station communicates with an outlet of the medium-temperature heat reservoir through a medium-temperature valve, and a heating pipe outlet communicates with an inlet of the medium-temperature cold reservoir; and the medium-temperature valve is electrically connected with the temperature sensor inside the expander unit lubrication station.

2. The regenerative compressed air energy storage system of claim 1, wherein an inlet at the low-temperature side of the compressor unit oil cooler communicates with an outlet of the medium-temperature cold reservoir and an outlet at the low-temperature side of the compressor unit oil cooler communicates with an inlet of the medium-temperature heat reservoir, respectively.

3. The regenerative compressed air energy storage system of claim 2, wherein the outlet of the medium-temperature cold reservoir communicates with the inlet at the low-temperature side of the compressor unit oil cooler through a first circulation pump.

4. The regenerative compressed air energy storage system of claim 1, wherein an inlet at the low-temperature side of the expander unit oil cooler communicates with an outlet of the medium-temperature cold reservoir and an outlet at the low-temperature side of the expander unit oil cooler communicates with an inlet of the medium-temperature heat reservoir, respectively.

5. The regenerative compressed air energy storage system of claim 4, wherein the outlet of the medium-temperature cold reservoir communicates with the inlet at the low-temperature side of the expander unit oil cooler through a second circulation pump.

6. The regenerative compressed air energy storage system of claim 1, wherein the highest point of the heating pipe inside the compressor unit lubrication station is lower than an operating liquid level of the high-temperature cold reservoir, and the lowest point of the heating pipe inside the compressor unit lubrication station is higher than an operating liquid level of the intermediate cold reservoir.

7. The regenerative compressed air energy storage system of claim 1, wherein the highest point of the heating pipe inside the expander unit lubrication station is lower than an operating liquid level of the medium-temperature heat reservoir, and the lowest point of the heating pipe inside the expander unit lubrication station is higher than an operating liquid level of the medium-temperature cold reservoir.

8. The regenerative compressed air energy storage system of claim 1, wherein outlets of the medium-temperature heat reservoir and the medium-temperature cold reservoir each communicates with an inlet of the high-temperature heat exchanger.

9. A method of operating a compressor unit lubrication and an expander unit lubrication in a regenerative compressed air energy storage system:
wherein the regenerative compressed air energy storage system comprises:
an air storage chamber, a compressor unit, an expander unit, a compressor unit lubrication station, an expander unit lubrication station, and an electric motor connected to the compressor unit and a generator connected to the expander unit, wherein a heating pipe and a temperature sensor are disposed inside each of the compressor unit lubrication station and the expander unit lubrication station;
an outlet of the compressor unit communicates with an inlet of the air storage chamber sequentially through the high-temperature sides of a high-temperature heat exchanger and a medium-temperature heat exchanger, and an outlet of the air storage chamber communicates with an inlet of the expander unit sequentially through a regulating valve and the low-temperature sides of a medium-temperature regenerator and a high-temperature regenerator;
the low-temperature side of the high-temperature heat exchanger, a high-temperature heat reservoir, a first valve, the high-temperature side of the high-temperature regenerator, a high-temperature cold reservoir and a second valve are connected in sequence end to end to form a high-temperature regenerative loop; the low-temperature side of the medium-temperature heat exchanger, a medium-temperature heat reservoir, a third valve, the high-temperature side of the medium-temperature regenerator, a medium-temperature cold reservoir and a fourth valve are connected in sequence end to end to form a medium-temperature regenerative loop;
the compressor unit lubrication station, a compressor unit oil pump, an oil way inside the compressor unit and the high-temperature side of a compressor unit oil cooler are connected in sequence end to end to form a first oil circulation loop; a heating pipe inlet inside the compressor unit lubrication station communicates with an outlet of the high-temperature cold reservoir through a high-temperature valve, and a heating pipe outlet communicates with an inlet of an intermediate cold reservoir; an outlet of the intermediate cold reservoir communicates with a pipeline for connecting the high-temperature cold reservoir and the second valve; and the high-temperature valve is electrically connected with the temperature sensor inside the compressor unit lubrication station; and
the expander unit lubrication station, an expander unit oil pump, an oil way inside the expander unit and the high-temperature side of an expander unit oil cooler are connected in sequence end to end to form a second oil circulation loop; a heating pipe inlet inside the expander unit lubrication station communicates with an outlet of the medium-temperature heat reservoir through a medium-temperature valve, and a heating pipe outlet communicates with an inlet of the medium-temperature cold reservoir; and the medium-temperature valve is electrically connected with the temperature sensor inside the expander unit lubrication station; and
the method of operating the compressor unity lubrication and the expand unit lubrication comprising:
S1.1, acquiring oil temperature of a compressor unit lubrication station, and proceeding to operation S1.2;
S1.2, judging whether the oil temperature of the compressor unit lubrication station is less than a first temperature threshold or not, if the oil temperature of the compressor unit lubrication station is less than the first temperature threshold, then proceeding to operation S1.1, and if the oil temperature of the compressor unit lubrication station is not less than the first temperature threshold, then proceeding to operation S1.3;
S1.3, starting an electric motor and a compressor unit oil pump, opening a second valve and a fourth valve, closing a first valve and a third valve, and proceeding to operation S1.4;
S1.4, acquiring oil temperature of an expander unit lubrication station, and proceeding to operation S1.5;

S1.5, judging whether the oil temperature of the expander unit lubrication station is less than a second temperature threshold or not, if the oil temperature of the expander unit lubrication station is less than the second temperature threshold, then proceeding to operation S1.6, and if the oil temperature of the expander unit lubrication station is not less than the second temperature threshold, then proceeding to operation S1.7;

S1.6, opening a medium-temperature valve, regulating the opening of the medium-temperature valve to be 100%, and proceeding to operation S1.4;

S1.7, judging whether the oil temperature of the expander unit lubrication station reaches a third temperature threshold or not, if the oil temperature of the expander unit lubrication station reaches the third temperature threshold, then proceeding to operation S1.8, and if the oil temperature of the expander unit lubrication station does not reach the third temperature threshold, then proceeding to operation S1.6, wherein the third temperature threshold is greater than the second temperature threshold;

S1.8, regulating the opening of the medium-temperature valve to be 50%, and proceeding to operation S1.9;

S1.9 acquiring the oil temperature of the expander unit lubrication station, and proceeding to operation S1.10;

S1.10, calculating the change rate of the oil temperature of the expander unit lubrication station, and proceeding to operation S1.11;

S1.11, judging whether the change rate of the oil temperature of the expander unit lubrication station is equal to zero, if the change rate of the oil temperature of the expander unit lubrication station is equal to zero, then proceeding to operation S1.9, and if the change rate of the oil temperature of the expander unit lubrication station is not equal to zero, then proceeding to operation S1.12;

S1.12, judging whether the change rate of the oil temperature of the expander unit lubrication station is greater than zero, if the change rate of the oil temperature of the expander unit lubrication station is greater than zero, then proceeding to operation S1.13, and if the change rate of the oil temperature of the expander unit lubrication station is not greater than zero, then proceeding to operation S1.14;

S1.13, decreasing the opening of the medium-temperature valve by 1% per minute and proceeding to operation S1.9; and S1.14, increasing opening of the medium-temperature valve by 1% per minute and proceeding to operation S1.9;

the method further comprises following operations at an energy release stage:

S2.1, acquiring the oil temperature of the expander unit lubrication station, and proceeding to operation S2.2;

S2.2, judging whether the oil temperature of the expander unit lubrication station is less than the second temperature threshold or not, if the oil temperature of the expander unit lubrication station is less than the second temperature threshold, then proceeding to operation S2.1, and if the oil temperature of the expander unit lubrication station is not less than the second temperature threshold, then proceeding to operation S2.3;

S2.3, starting the expander unit oil pump, opening a regulating valve, the first valve and the third valve, closing the second valve and the fourth valve, and proceeding to operation S2.4;

S2.4, acquiring the oil temperature of the compressor unit lubrication station, and proceeding to operation S2.5;

S2.5, judging whether the oil temperature of the compressor unit lubrication station is less than the first temperature threshold or not, if the oil temperature of the compressor unit lubrication station is less than the first temperature threshold, then proceeding to operation S2.6, and if the oil temperature of the compressor unit lubrication station is not less than the first temperature threshold, then proceeding to operation S2.7;

S2.6, opening a high-temperature valve, regulating opening of the high-temperature valve to be 100%, and proceeding to operation S2.4;

S2.7, judging whether the oil temperature of the compressor unit lubrication station reaches a fourth temperature threshold or not, if the oil temperature of the compressor unit lubrication station reaches the fourth temperature threshold, then proceeding to operation S2.8, and if the oil temperature of the compressor unit lubrication station does not reach the fourth temperature threshold, then proceeding to operation S2.6, wherein the fourth temperature threshold is greater than the first temperature threshold;

S2.8, regulating opening of the high-temperature valve to be 50%, and proceeding to operation S2.9;

S2.9 acquiring the oil temperature of the compressor unit lubrication station, and proceeding to operation S2.10;

S2.10, calculating the change rate of the oil temperature of the compressor unit lubrication station, and proceeding to operation S2.11;

S2.11, judging whether the change rate of the oil temperature of the compressor unit lubrication station is equal to zero, if the change rate of the oil temperature of the compressor unit lubrication station is equal to zero, then proceeding to operation S2.9, and if the change rate of the oil temperature of the compressor unit lubrication station is not equal to zero, then proceeding to operation S2.12;

S2.12, judging whether the change rate of the oil temperature of the compressor unit lubrication station is greater than zero, if the change rate of the oil temperature of the compressor unit lubrication station is greater than zero, then proceeding to operation S2.13, and if the change rate of the oil temperature of the compressor unit lubrication station is not greater than zero, then proceeding to operation S2.14;

S2.13, decreasing opening of the high-temperature valve by 1% per minute and proceeding to operation S2.9; and S2.14, increasing opening of the high-temperature valve by 1% per minute and proceeding to operation S2.9.

* * * * *